(12) United States Patent
Lesner et al.

(10) Patent No.: US 10,229,100 B1
(45) Date of Patent: Mar. 12, 2019

(54) AUGMENTED REALITY FORM FILL

(71) Applicant: Intuit Inc., Mountain View, CA (US)

(72) Inventors: Christopher Lesner, Palo Alto, CA (US); Alexander S. Ran, Palo Alto, CA (US)

(73) Assignee: Intuit Inc., Mountain View, CA (US)

( * ) Notice: Subject to any disclaimer, the term of this patent is extended or adjusted under 35 U.S.C. 154(b) by 67 days.

(21) Appl. No.: 15/136,307

(22) Filed: Apr. 22, 2016

(51) Int. Cl.
*G06F 17/24* (2006.01)
*G06T 19/00* (2011.01)
*H04L 12/58* (2006.01)

(52) U.S. Cl.
CPC .......... *G06F 17/243* (2013.01); *G06T 19/006* (2013.01); *H04L 51/22* (2013.01)

(58) Field of Classification Search
CPC .................................................. G06F 17/243
USPC ........................................................ 715/225
See application file for complete search history.

(56) References Cited

U.S. PATENT DOCUMENTS

| | | |
|---|---|---|
| 7,283,999 B1 | 10/2007 | Ramesh et al. |
| 7,428,636 B1 | 9/2008 | Waldspurger et al. |
| 7,702,683 B1 | 4/2010 | Kirshenbaum |
| 7,815,106 B1 | 10/2010 | McConnell |
| 7,865,829 B1 | 1/2011 | Goldfield et al. |
| 7,890,754 B2 | 2/2011 | Waldspurger et al. |
| 8,024,660 B1 | 9/2011 | Quinn et al. |
| 8,037,145 B2 | 10/2011 | Bunker et al. |
| 8,046,298 B1 | 10/2011 | Voth et al. |
| 8,321,319 B1 | 11/2012 | Grossblatt et al. |
| 8,374,986 B2 | 2/2013 | Indeck et al. |
| 8,494,929 B1 | 7/2013 | Borgen et al. |
| 8,544,726 B1 | 10/2013 | Hahn |
| 8,655,862 B1 | 2/2014 | Riley et al. |
| 8,719,120 B1 | 5/2014 | McVickar et al. |
| 8,949,371 B1 | 2/2015 | Shrowty |
| 8,977,626 B2 | 3/2015 | Hess |
| 9,047,243 B2 | 6/2015 | Taylor et al. |
| 9,305,056 B1 | 4/2016 | Gupta et al. |
| 9,348,857 B2 | 5/2016 | Glover |
| 2005/0091151 A1 | 4/2005 | Coleman et al. |
| 2005/0120004 A1 | 6/2005 | Stata et al. |
| 2005/0268217 A1* | 12/2005 | Garrison ............... G06F 17/243 715/234 |
| 2006/0200754 A1* | 9/2006 | Kablesh ................ G06F 17/243 715/226 |

(Continued)

FOREIGN PATENT DOCUMENTS

WO    WO 2014/074075    5/2014

OTHER PUBLICATIONS

Hull, Jonathan J., Berna Erol, Jamey Graham, Qifa Ke, Hidenobu Kishi, Jorge Moraleda, and Daniel G. Van Olst. "Paper Based Augmented Reality." In Artificial Reality and Telexistence, 17th International Conference on, pp. 205-209. IEEE, 2007. (Year: 2007).*

*Primary Examiner* — Frank D Mills
(74) *Attorney, Agent, or Firm* — Hawley Troxell Ennis & Hawley LLP; Philip McKay

(57) ABSTRACT

A method and system provides augmented reality form-fill assistance to a user. The method and system include receiving image data related to an image of a paper form to be filled out by the user, matching the image data to known form data stored in a database, and generating augmented image data by populating data fields of the image data with appropriate user attribute data entries.

17 Claims, 3 Drawing Sheets

(56) References Cited

U.S. PATENT DOCUMENTS

| | | |
|---|---|---|
| 2006/0294311 A1 | 12/2006 | Fu et al. |
| 2008/0320316 A1 | 12/2008 | Waldspurger et al. |
| 2009/0183159 A1 | 7/2009 | Michael et al. |
| 2012/0109723 A1 | 5/2012 | Crooks et al. |
| 2013/0159449 A1 | 6/2013 | Taylor et al. |
| 2013/0272523 A1* | 10/2013 | McCorkindale ......... H04N 1/44 380/243 |
| 2014/0041047 A1 | 2/2014 | Jaye et al. |
| 2014/0188756 A1* | 7/2014 | Ponnavaikko ..... G06K 9/00449 705/342 |
| 2014/0195395 A1 | 7/2014 | Bhakta et al. |
| 2014/0244457 A1 | 8/2014 | Howell et al. |
| 2015/0142624 A1 | 5/2015 | Buttonow et al. |
| 2015/0178856 A1 | 6/2015 | Flores |
| 2015/0205777 A1* | 7/2015 | Campanelli ........... G06F 17/243 715/226 |
| 2015/0206109 A1 | 7/2015 | Caldwell et al. |
| 2015/0324410 A1 | 11/2015 | Glover |
| 2015/0363704 A1 | 12/2015 | Yong et al. |
| 2015/0379430 A1 | 12/2015 | Dirac et al. |
| 2016/0063645 A1 | 3/2016 | Houseworth et al. |
| 2016/0217119 A1* | 7/2016 | Dakin ................... G06F 17/243 |
| 2017/0053012 A1 | 2/2017 | Levy et al. |
| 2017/0193045 A1 | 7/2017 | Young et al. |
| 2017/0316506 A1 | 11/2017 | Lesner et al. |

\* cited by examiner

AUGMENTED REALITY FORM FILL

BACKGROUND

When visiting government offices, dentist offices, banks, hospitals, and numerous other locations people are often required to fill out paper forms in order to receive service. Such forms often ask for information such as names, addresses, telephone numbers, credit card or bank account numbers, social security numbers, driver's license numbers, passport numbers, student ID numbers, vehicle license plates and VIN numbers, insurance policy numbers, etc. Some forms ask for contact information for references. Some forms ask for dates of events such as date of birth, marriage date, stop and start dates for education, employment, leases, etc.

Filling out such forms often includes great efforts to retrieve or remember the requested information. This process can be both time consuming and frustrating. Furthermore, when one has a spouse and/or dependents the numbers of forms and requested information can multiply significantly. The average adult uses more than a hundred different values when filling out forms. Some of these values never change, others change rarely, and still others change frequently. Remembering all of these values can difficult. Many people carry identification cards in their wallets or purses just in case they need the information when filling out a form. In some cases such information must be retrieved from filing cabinets or other inconvenient locations. All of these factors can make filling of forms a frustrating and difficult experience.

Some organizations have replaced paper forms with electronic forms to be completed on a computing device and submitted electronically. However, even in these circumstances the requested information must typically still be retrieved or remembered by the person. Thus, even in an age when information is digitized and easily exchanged, people still waste countless hours looking up and filling in the same information again and again.

Additionally, some electronic form-fill assistance systems such as are present in web browsers attempt to assist users in filling out forms. However millions of forms in common use today are still printed on paper and filled out on paper so that when one has a pen and clipboard in one's hands and needs form-fill assistance the most (at a hospital or doctor or dentist or mortgage agents office, etc.) these existing electronic systems cannot help.

For situations such as these what is needed is a system for providing personalized augmented reality form-fill assistance.

SUMMARY

Embodiments of the present disclosure address some of the difficulties of typical electronic form-fill assistance systems by providing systems and methods for providing personalized augmented reality form-fill assistance to a user filling out a paper form. In particular, embodiments of the present disclosure receive image data representing an image of a paper form to be filled out by the user, analyze the image data, retrieve personalized information related to the user, and present to the user augmented image data that includes data fields populated with the form requested information. For example, a user of a system for providing augmented reality form-fill assistance can receive a paper form, position a camera of an electronic computing device to capture an image of the paper form, and view on a screen of the personal computing device an augmented image of the paper form that includes the requested information in the data fields of the form. The user can then easily fill out the paper form by referencing the already populated augmented image data. Alternatively, the user can print the augmented image and hand it in, or electronically submit the augmented image data. By analyzing an image of the paper form, retrieving user data from one or more databases, and generating augmented image data that includes the requested user data, an automated form-fill assistance system provides improved assistance in filling out paper forms.

In one embodiment, an augmented reality form-fill assistance system receives the image data related to the paper form, analyzes the image data, and compares the image data to known form data stored in one or more databases. The known form data corresponds to paper forms that have already been analyzed and catalogued by the system. If the system can match the image data to a known form, the system determines what type of data is requested in each data field of the image data, retrieves user data corresponding to the requested data for each data field, and generates augmented image data. The data fields in the augmented image data are populated with the appropriate user data. The system presents the augmented image data to the user.

In one embodiment, if the image data does not match any known paper form as represented by the known form data, then the augmented reality form-fill assistance system presents the image data to the user along with a plurality of icons representing types of data that are commonly requested in paper forms. The user can then match the data fields to appropriate icons. As the user matches the data fields to the appropriate icons, the system generates augmented image data that includes the appropriate user attribute data in the data fields. The user does not need to fish through her wallet or search their filing cabinets to look up the requested user attribute data. The system retrieves the user attribute data and enters it into the data fields. The user only needs to indicate what type of data is requested in each data field. The system then adds in the actual data. The user can then fill out the paper form quickly by referencing the augmented image data. Alternatively, the user can print or electronically submit the augmented image data.

In one embodiment, as the user matches each data field to an appropriate icon, the system learns what type of information is requested for each field of the form. The system can then store and catalogue the form in the known user data. Subsequently, if a second user needs to fill out a copy of the same paper form, the user can capture an image of the paper form and the system can match the image to the known user data and automatically generate augmented image data that fills in the data fields with second user's user attribute data.

A form-fill assistance system in accordance with one or more embodiments provides augmented reality form-fill assistance that is more reliable than in traditional systems by providing augmented reality form-fill assistance based on a database of known forms and user attribute data. The various embodiments of the disclosure can be implemented to improve the technical fields of user experience, services marketing, data collection, and data processing. Therefore, the various described embodiments of the disclosure and their associated benefits amount to significantly more than an abstract idea. In particular, by analyzing image data related to a paper form and matching the image data to a known paper form, users can save both money and time.

The disclosed embodiments of this form-fill assistance system and method provide a technical solution to the long standing technical problem of quickly and reliably providing users with form-fill assistance.

In addition, the disclosed embodiments of a method and system for providing augmented reality form-fill assistance are also capable of dynamic adaptation to the needs of users. Consequently, the disclosed embodiments of a method and system for providing augmented reality form-fill assistance also provides a technical solution to the long-standing technical problem of static and inflexible form-fill assistance.

The result is a much more accurate, adaptable, and robust, method and system for providing form-fill assistance, that thereby serves to bolster confidence in electronic form-fill assistance systems. This, in turn, results in: less human and processor resources being dedicated to analyzing images of paper forms because more accurate and efficient analysis methods can be implemented, i.e., fewer processing and memory storage assets; less memory and storage bandwidth dedicated to buffering and storing image data; less communication bandwidth being utilized for image data transmission.

The disclosed method and system for providing augmented reality form-fill assistance does not encompass, embody, or preclude other forms of innovation in the area of providing electronic form-fill assistance. In addition, the disclosed method and system for providing augmented reality form-fill assistance is not related to any fundamental economic practice, fundamental data processing practice, mental steps, or pen and paper based solutions, and is, in fact, directed to providing solutions to new and existing problems associated with electronic form-fill assistance systems. Consequently, the disclosed method and system for providing augmented reality form-fill assistance, does not encompass, and is not merely, an abstract idea or concept.

Figure 1:
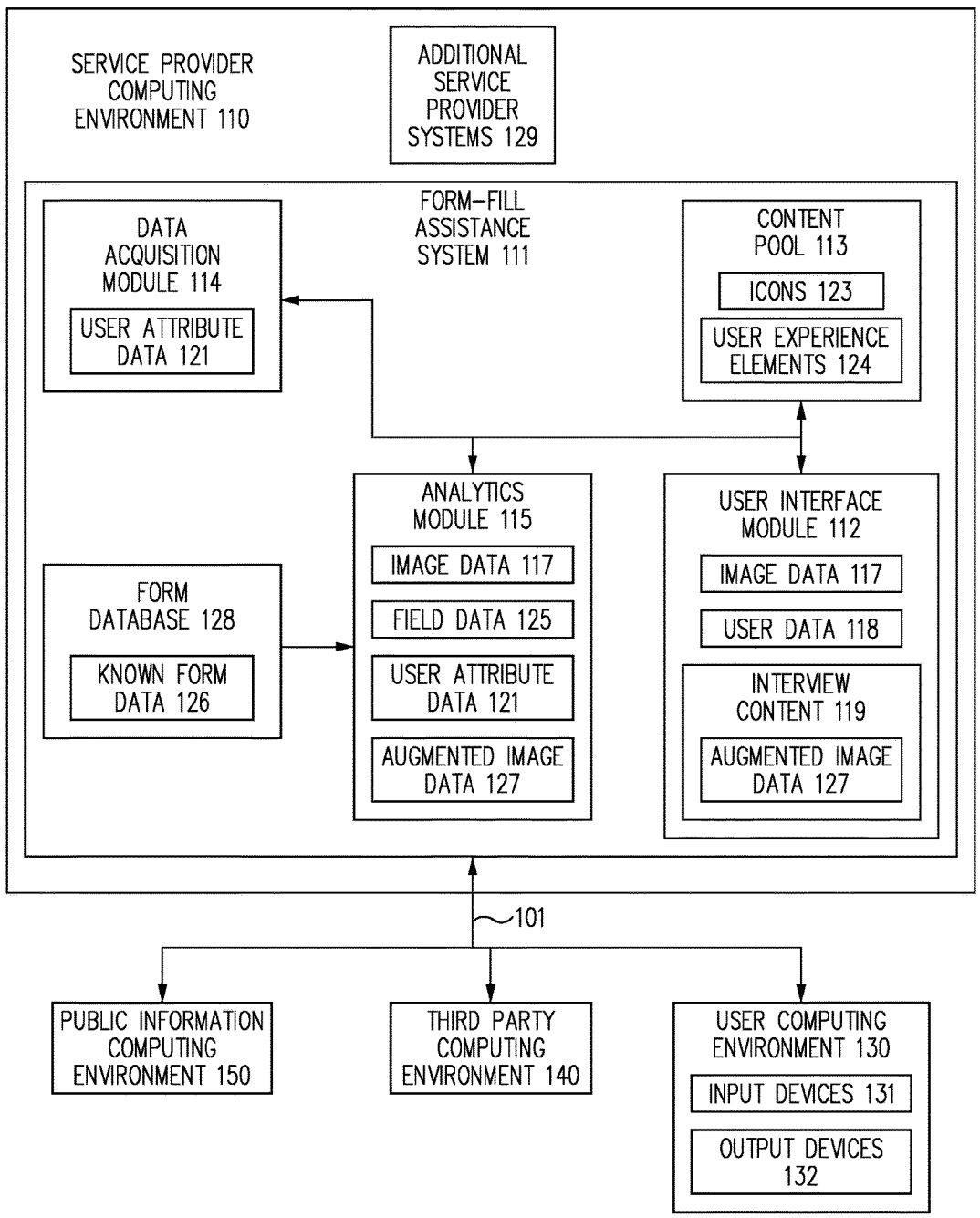
FIG. 1 is a block diagram of software architecture for providing augmented reality form-fill assistance, in accordance with one embodiment.

Common reference numerals are used throughout the FIG.s and the detailed description to indicate like elements. One skilled in the art will readily recognize that the above FIG.s are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be implemented in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

Herein, the term "production environment" includes the various components, or assets, used to deploy, implement, access, and use, a given application as that application is intended to be used. In various embodiments, production environments include multiple assets that are combined, communicatively coupled, virtually and/or physically connected, and/or associated with one another, to provide the production environment implementing the application.

As specific illustrative examples, the assets making up a given production environment can include, but are not limited to, one or more computing environments used to implement the application in the production environment such as a data center, a cloud computing environment, a dedicated hosting environment, and/or one or more other computing environments in which one or more assets used by the application in the production environment are implemented; one or more computing systems or computing entities used to implement the application in the production environment; one or more virtual assets used to implement the application in the production environment; one or more supervisory or control systems, such as hypervisors, or other monitoring and management systems, used to monitor and control assets and/or components of the production environment; one or more communications channels for sending and receiving data used to implement the application in the production environment; one or more access control systems for limiting access to various components of the production environment, such as firewalls and gateways; one or more traffic and/or routing systems used to direct, control, and/or buffer, data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement the application in the production environment; one or more databases used to store data in the production environment; one or more internal or external services used to implement the application in the production environment; one or more backend systems, such as backend servers or other hardware used to process data and implement the application in the production environment; one or more software systems used to implement the application in the production environment; and/or any other assets/components making up an actual production environment in which an application is deployed, implemented, accessed, and run, e.g., operated, as discussed herein, and/or as known in the art at the time of filing, and/or as developed after the time of filing.

As used herein, the terms "computing system", "computing device", and "computing entity", include, but are not limited to, a virtual asset; a server computing system; a workstation; a desktop computing system; a mobile computing system, including, but not limited to, smart phones, portable devices, and/or devices worn or carried by a user; a database system or storage cluster; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms computing system and computing entity, can denote, but are not limited to, systems made up of multiple: virtual assets; server computing systems; workstations; desktop computing systems; mobile computing systems; database systems or storage clusters; switching systems; routers; hardware systems; communications systems; proxy systems; gateway systems; firewall systems; load balancing systems; or any devices that can be used to perform the processes and/or operations as described herein.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known environments, e.g., "trusted" environments, or unknown, e.g., "untrusted" environments. Typically, trusted computing environments are those where the assets, infrastructure, communication and networking systems, and security systems associated with the computing systems and/or virtual assets making up the trusted computing environment, are either under the control of, or known to, a party.

In various embodiments, each computing environment includes allocated assets and virtual assets associated with, and controlled or used to create, and/or deploy, and/or operate an application.

In various embodiments, one or more cloud computing environments are used to create, and/or deploy, and/or operate an application that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given application or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through, a cloud computing environment; and/or any other virtualized assets and/or sub-systems of "bare metal" physical devices such as mobile devices, remote sensors, laptops, desktops, point-of-sale devices, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing, can be implemented as one or more virtual assets.

In one embodiment, two or more assets, such as computing systems and/or virtual assets, and/or two or more computing environments, are connected by one or more communications channels including but not limited to, Secure Sockets Layer communications channels and various other secure communications channels, and/or distributed computing system networks, such as, but not limited to: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

As used herein, the term "user" includes, but is not limited to, any party, parties, entity, and/or entities using, or otherwise interacting with any of the methods or systems discussed herein. For instance, in various embodiments, a user can be, but is not limited to, a person, a commercial entity, an application, a service, and/or a computing system.

As used herein, the term "relationship(s)" includes, but is not limited to, a logical, mathematical, statistical, or other association between one set or group of information, data, and/or users and another set or group of information, data, and/or users, according to one embodiment. The logical, mathematical, statistical, or other association (i.e., relationship) between the sets or groups can have various ratios or correlation, such as, but not limited to, one-to-one, multiple-to-one, one-to-multiple, multiple-to-multiple, and the like, according to one embodiment. As a non-limiting example, if the disclosed form-fill assistance system determines a relationship between a first group of data and a second group of data, then a characteristic or subset of a first group of data can be related to, associated with, and/or correspond to one or more characteristics or subsets of the second group of data, or vice-versa, according to one embodiment. Therefore, relationships may represent one or more subsets of the second group of data that are associated with one or more subsets of the first group of data, according to one embodiment. In one embodiment, the relationship between two sets or groups of data includes, but is not limited to similarities, differences, and correlations between the sets or groups of data.

As used herein, the terms "interview" and "interview process" include, but are not limited to, an electronic, software-based, and/or automated delivery of multiple questions to a user and an electronic, software-based, and/or automated receipt of responses from the user to the questions, according to various embodiments.

Hardware Architecture

FIG. 1 illustrates a block diagram of a production environment 100 for providing augmented reality form-fill assistance to a user, according to one embodiment. Embodiments of the present disclosure provide methods and systems for providing augmented reality form-fill assistance to a user, according to one embodiment. In particular, embodiments of the present disclosure analyze image data related to an image of a paper form to be filled out by a user and match it to known form data corresponding one of plurality of known form. Embodiments of the present disclosure retrieve user attribute data related to attributes of the user and augment the image data by superimposing appropriate user attribute data on the image data. By providing the augmented image data to the user, user confidence in the augmented reality form-fill assistance is increased.

In addition, the disclosed method and system for providing augmented reality form-fill assistance to a user provides for significant improvements to the technical fields of electronic transaction data processing, data processing, data management, and user experience.

In addition, as discussed above, the disclosed method for providing augmented reality form-fill assistance to a user provides for the processing and storing of smaller amounts of data, i.e., more efficiently analyze image data and relevant known form data to generate augmented image data; thereby eliminating unnecessary data analysis and storage. Consequently, using the disclosed method and for providing augmented reality form-fill assistance to a user results in more efficient use of human and non-human resources, fewer processor cycles being utilized, reduced memory utilization, and less communications bandwidth being utilized to relay data to, and from, backend systems and client systems, and various investigative systems and parties. As a result, computing systems are transformed into faster, more efficient, and more effective computing systems by implementing the method and for providing augmented reality form-fill assistance to a user.

The production environment 100 includes a service provider computing environment 110, a user computing environment 130, a public information computing environment 150, and a third party computing environment 140 for providing augmented reality form-fill assistance, according to one embodiment. The computing environments 110, 130, 140, and 150 are communicatively coupled to each other with one or more communication channels 101, according to one embodiment.

The service provider computing environment 110 represents one or more computing systems such as a server, a computing cabinet, and/or distribution center that is configured to receive, execute, and host one or more form-fill assistance systems (e.g., applications) for access by one or more users, according to one embodiment. The service provider computing environment 110 represents a traditional data center computing environment, a virtual asset computing environment (e.g., a cloud computing environment), or a hybrid between a traditional data center computing environment and a virtual asset computing environment, according to one embodiment.

The service provider computing environment 110 includes a form-fill assistance system 111, which is configured to provide augmented reality form-fill assistance to a user.

According to an embodiment, the form-fill assistance system 111 receives image data from a user, analyzes the image data related to an image of a paper form to be filled out by the user. The form-fill assistance system 111 analyzes the image data to identify data fields corresponding to the fields of the paper form. The form-fill assistance system 111 compares the image data to a database of known form data. The known form data corresponds to forms that have previously been analyzed and processed by the form-fill assistance system 111. The form-fill assistance system 111 matches the image data to one of the known paper forms based on the known form data. The form-fill assistance system 111 retrieves user attribute data related to the user. The form-fill assistance system 111 then augments the image data by filling in the data fields with appropriate user attribute data. The form-fill assistance system 111 then provides the augmented image data to the user, for example, on the display of a computing device of the user. The user can then reference the augmented image data while filling out the paper form, thereby eliminating the need to retrieve or remember large amounts of data for filling out the form. The form-fill assistance system 111 includes various components, databases, engines, modules, and/or data to support providing augmented reality form-fill assistance to a user, according to one embodiment.

The form-fill assistance system 111 includes a user interface module 112, a data acquisition module 114, and an analytics module 115, according to one embodiment. The user interface module 112 enables the user to interface with the form-fill assistance system 111.

The user interface module 112 guides a user through the process of using the form-fill assistance system 111 to assist the user in filling out a paper form. For example, the user interface module 112 may provide interview content 119 that prompts the user to provide image data 117 relating to an image of a paper form to be filled out by the user. The user interface module 112 may also prompt the user to provide user data that is related to the user. In response, the user provides user data 118 and image data 117 related to an image of a paper form to be filled out by the user. The form-fill assistance system 111 generates augmented reality form-fill assistance related to the image data so that the user can avoid the cumbersome process of retrieving or recollecting personal data requested for the paper form.

The user interface module 112 receives the image data 117 and the user data 118 in response to providing interview content 119, according to one embodiment. The user interface module 112 populates interview content 119 from a content pool 113. The content pool includes icons 123 and user experience elements 124. The user experience elements 124 include, but are not limited to, buttons, slides, dialog boxes, text boxes, drop-down menus, banners, tabs, directory trees, links, audio content, video content, and/or other multimedia content for receiving image data 117 and user data 118 from the user computing environment 130 and for providing questions, and augmented reality form-fill assistance to the user computing environment 130, according to one embodiment.

The user computing environment 130 includes input devices 131 and output devices 132 for communicating with the user, according to one embodiment. The input devices 131 include, but are not limited to, keyboards, mice, microphones, touchpads, touchscreens, digital pens, cameras, and the like. The output devices 132 include, but are not limited to, speakers, monitors, touchscreens, displays, and the like.

Returning to the form-fill assistance system 111, the user interface module 112 is configured to receive the image data 117 from the user, according to one embodiment. The image data 117 relates to an image of a paper form to be filled out by the user. The paper form includes a plurality of fields that request particular types of user attribute data to be provided by the user. The paper form may include fields that request types of information that may be difficult to remember and which the user can only retrieve with some effort and inconvenience. Instead of going through the cumbersome process of trying to retrieve or remember all the various types of data requested by the form, the user can instead capture an image of the paper form, for example with the camera of a smart phone or a tablet computer, and provide the image data 117 related to the image of the paper form to the form-fill assistance system 111 via the user interface module 112. The analytics module 115 of the form-fill assistance system 111 analyzes the image data 117 and generates field data 125 by identifying the data fields of the image data 117 that correspond to the fields of the paper form. In particular, the field data can indicate the positions and sizes of the various data fields in the image data 117.

The form database 128 is a database of paper forms that have already been processed and catalogued by the form-fill assistance system 111. The known form data 126 corresponds to the known forms. The known form data 126 catalogs the paper forms based on the positions and sizes of the data fields in the respective image data corresponding to the known paper forms. Furthermore, the known form data 126 includes known form field data that indicates the type of data requested in each data field of the known forms.

In one embodiment, the analytics module 115 retrieves known form data 126 from the form database 128 and compares the image data 117 and/or the field data 125 to the known form data 126. The analytics module 115 compares the image data 117 to the known form data 126 in order to match the image data 117 to a known paper form as represented by the known form data 126. In one example, the analytics module 115 matches the image data 117 to a known form based on the relative positions and sizes of the data fields in the image data 117 as represented by the field data 125. When the analytics module 115 has matched the image data 117 to a known form represented in the known form data 126, the analytics module 115 retrieves from the database of known form data 126 the type of data requested in each data field of the image data 117. The analytics module 115 then imports user attribute data 121 from the data acquisition module 114 and generates augmented reality image data 127 by filling in each data field of the image data 117 with a respective user attribute data entry from the user attribute data 121. The analytics module 115 then provides the augmented image data 127 to the user.

In one embodiment, the augmented image data 127 corresponds to an image of the paper form augmented with appropriate user attribute data entries retrieved from the user attribute data 121. The augmented image data 127 is provided to the user interface module 112 which then provides the augmented image data 127 to the user via the user interface. In one example, the augmented image data 127 is displayed to the user on the screen of a computing device of the user, such as a smart phone, a tablet computer, a laptop computer, a desktop computer, or another suitable user device. The user can reference the augmented image data 127 while filling out the paper form. Because the augmented image data 127 includes appropriate user attribute data entries in each of the data fields of the image data 117, the user does not need to make effort to retrieve or recollect information requested in the fields of the paper form. Instead, the user can merely look at the augmented image data and copy, by hand, the requested information into the paper form. In this way, the form-fill assistance system 111 provides augmented reality form-fill assistance to the user.

In one embodiment, when the analytics module 115 has generated augmented image data 127 that includes appropriate user attribute data entries in each of the data fields of the image data 117, the user interface module 112 can provide to the user a plurality of options for outputting the augmented image data 127. For example, the user interface module 112 may ask the user if the user would like to print the augmented image data 127. The form-fill assistance system 111 can identify available printers and ask the user if the user would like the form-fill assistance system 111 to print the augmented image data 127 to one of the available printers. When the user selects an available printer, the form-fill assistance system 111 sends the augmented image data 127 to the printer. The printer then prints a paper form corresponding to the augmented image data 127 with each of the fields already populated by appropriate user attribute data entries.

In one embodiment, when the analytics module 115 has generated augmented image data 127 that includes appropriate user attribute data entries in each of the data fields of the image data 117, the user interface module 112 can ask the user if the user would like to electronically submit the augmented image data 127 to the organization that requested the user fill out the paper form. For example, the form-fill assistance system 111 can submit the augmented image data 127 via email or fax to an email address or fax number associated with the organization. The form-fill assistance system 111 can scan and OCR this address information (possibly using barcodes or QR codes) or retrieve email addresses or fax numbers from a database. Otherwise, the user can provide an email address or fax number to the form-fill assistance system 111.

Thus, in one embodiment, when the user is presented with a paper form to fill out, the user may simply take a picture of the paper form and the form-fill assistance system 111 will fill out an electronic version of the form in the manner described above and print or electronically submit a populated version of the paper form. Thus the user can produce a populated paper form by making minimal inputs on a user computing device, such as by tapping an icon that activates the form-fill assistance system 111 and then possibly tapping another icon to submit or print a populated version of the paper form. This eliminates the need to retrieve or recollect large amounts of user attribute data 121 and to fill out by hand a paper form.

The user attribute data 121 includes personal information related to the user. In particular, the user attribute data 121 includes the user attribute data entries that are commonly requested in the fields of paper forms of various types. Thus, the user attribute data 121 includes user attribute data entries that are likely to be requested in the data fields of the image data 117. For example, the user attribute data 121 can include user attribute data entry such as a first name of the user, a middle name of the user, a last name of the user, a birth date of the user, a home address of the user, and email address of the user, a business address of the user, and employer of the user, of the employer of the user, a phone number of the employer of the user, a home phone number of the user, a mobile phone number of the user, a license plate number of the user, a driver's license number of the user, a Social Security number of the user, and employer identification number. a name of a spouse of the user, a birth date of the spouse of the user, a Social Security number of the spouse of the user, a marital status of the user, a name of a child of the user, a birth date of the child of the user, a Social Security number of the child of the user, educational information of the user, medical information of the user, a maiden name of the user, a government identification of the user, income data of the user, tax data of the user, credit information of the user, bank account numbers of the user, routing numbers of the user, a ZIP Code of the user, property ownership data of the user, mortgage data of the user, a model, make, and year of an automobile of the user, a car insurance policy number of the user, a health insurance policy number of the user, health insurance policy number of a spouse or dependent of the user, or other types of user attribute data entries that are likely to be requested in the field of a form.

The data acquisition module 114 can gather the user attribute data 121 from a variety of sources. For example, the data acquisition module 114 can gather the user attribute data from the user data 118 previously supplied to the form-fill assistance system 111 by the user. For example, when the user creates an account with the form-fill assistance system 111, the form-fill assistance system 111 can ask for various types of user data from the user. The user can elect to import their data by having the system digitize their documents (for example driver's permits, birth certificates, SSN cards, passports, etc.) and/or by having the system digitize forms they have already filled out such as job or rental applications. Additionally, the data acquisition module 114 can gather the user attribute data 121 automatically from the user computing environment 130. For example, the user computing environment 130 may include many types of user data stored in memory. The data acquisition module 114 can retrieve the user attribute data 121 from the user computing environment 130. The user interface module 112 may provide, with the interview content 119, a prompt to the user requesting permission to collect user data from the user computing environment 130. With the user's permission, the data acquisition module 114 can collect user attribute data 121 from various sources in the user computing environment 130.

In one embodiment, the data acquisition module 114 is configured to communicate with additional service provider systems 129, e.g., a tax return preparation system, a payroll management system, a financial management system, or other type of system to access and collect data related to the user to supply or supplement the user attribute data 121, according to one embodiment. The data acquisition module 114 imports relevant portions of user data, including financial data, into the form-fill assistance system 111 and, for example, saves local copies into one or more databases, according to one embodiment.

In one embodiment, the additional service provider systems 129 include a tax return preparation system, and the data acquisition module 114 is configured to acquire user attribute data 121, for use by the form-fill assistance system 111 in providing augmented reality form-fill assistance to the user, according to an embodiment. Because the services provider provides both the form-fill assistance system 111 and the additional service provider systems, the service provider computing environment 110 can be configured to share data between the various systems. By interfacing with the additional service provider systems 129, the data acquisition module 114 can collect user attribute data 121. The user attribute data 121 can include name data, address data, social security numbers, birthdates income data, tax return data, investment data, property ownership data, social security numbers, age data, data regarding additional sources of income, marital status, number and ages of children or other dependents, geographic location, and other data that indicates personal and financial characteristics of the user or of other users of the form-fill assistance system 111 and/or the additional service provider systems 129, according to one embodiment.

In one embodiment, the additional service provider systems 129 include a payroll system that manages the payroll of a large number of employers. The data acquisition module 114 is configured to acquire information from the additional service provider systems to supply or supplement the user attribute data 121, for use by the form-fill assistance system 111 in providing augmented reality form-fill assistance, according to one embodiment. Because the financial services provider provides both the form-fill assistance system 111 and the payroll system, the service provider computing environment 110 can be configured to share data between the various systems. By interfacing with the additional service provider systems 129, the data acquisition module 114 obtains and/or supplements the user attribute data 121. The information can include income data, salary data, geographic location data, numbers of exemptions claimed in a tax return, length of tenure with the employer, banking data, withholding data, investment data, and other types of data that indicate financial and personal characteristics of the employees of the employer.

The additional service provider systems 129 can include financial services other than payroll and tax return preparation systems. For example, the additional service provider systems can include personal financial management systems that manage one or more of banking, investments, credit cards, loans, retirement accounts, budgeting, or financial interests. The data acquisition module 114 can gather data from databases associated with the additional service provider systems 129.

The data acquisition module 114 is configured to acquire financial data from third parties, according to one embodiment. For example, the data acquisition module 114 requests and receives data from the third party computing environment 140 to supply or supplement the user attribute data 121, according to one embodiment. In one embodiment, the third party computing environment 140 is configured to automatically transmit user attribute data to the form-fill assistance system 111 (e.g., to the data acquisition module 114), to be merged into the user attribute data 121. The third party computing environment 140 can include, but is not limited to, financial service providers, state institutions, federal institutions, private employers, financial institutions, social media, and any other business, organization, or association that has maintained data, that currently maintains data, or which may in the future maintain data related to the user, according to one embodiment.

The data acquisition module 114 is configured to acquire additional user attribute data from the public information computing environment 150, according to one embodiment. The user attribute data 121 can be gathered from public record searches of tax records, public information databases, property ownership records, and other public sources of information. The data acquisition module 114 can also acquire data from sources such as social media websites, such as Twitter, Facebook, LinkedIn, Instagram, and the like.

In one embodiment, the data acquisition module 114 can retrieve location data related to a current location of the user. The analytics module 115 can use the location data in order to assist in matching the image data 117 to a known paper form. For example, if location data stored in a mobile computing device of the user indicates that the user is at a particular medical facility, then the analytics module 115 can compare the image data 117 to known forms that are commonly associated with that particular medical facility. This can assist the analytics module 115 in accurately matching the image data 117 to a known form as presented in the known form data 126.

In one embodiment, the analytics module 115 analyzes the image data 117 using optical character recognition (OCR) analysis to determine the type of information requested in one or more of the data fields of the image data 117. If the analytics module 115 can accurately ascertain the type of data requested in one or more of the data fields, the analytics module 115 can use this information to match the image data 117 to a known form as represented by the known form data 126. Additionally or alternatively, the OCR analysis can indicate a name of the form. Using the name of the form, the analytics module 115 can match the image data 117 to a known form as represented in the known form data 121. Once the analytics module 115 has matched the image data 117 to a known form, then the analytics module 115 can accurately determine the type of data requested in each of the other data fields of the image data 117.

In one embodiment, the analytics module 115 can use many other techniques when analyzing the image data 117 in order to determine features of the image data 117 that can assist in matching the image data 117 to a known form as represented by the known form data 126. For example, the analytics module 115 can utilize image feature extraction analysis, model training analysis, confidence thresholds and other techniques to assist in analyzing the image data 117 and matching the image data 117 to a known form as represented by the known form data 126.

It is possible that the analytics module 115 will fail to match the image data 117 to a known form as represented by the known form data 126. The analytics module 115 may fail to match the image data 117 to a known form even though the image data 117 is related to a paper form that is known by the system. This can occur due to poor image quality arising from stains on the paper form, poor quality of the captured image, poor lighting crumpling or tearing of the paper form, glare in the captured image, the angle of the captured image, similarity in shape and appearance between certain typed letters or numbers, etc.

In one embodiment, if the analytics module 115 fails to match the image data 117 to a known form, then the analytics module 115 can provide augmented reality form-fill assistance in an alternate manner. In particular, the analytics module 115 can present to the user, together with the image data 117, icons 123 that represent various types of user attribute data entries that are commonly requested in the fields of paper forms. The icons 123 may include a graphical representation that suggests a type of data such as name, address, birthday, etc. Alternatively, the icons 123 can include text explicitly identifying types of requested data. In any case, the user interface module 112 presents to the user a plurality of icons and invites the user to match each data field in the image data 117 to one or more of the icons. For example, if one of the data fields requests the user's driver's license number, the user can match that data field to an icon representing the user driver's license number. The analytics module 115 then generates augmented image data 127 that includes the user's actual driver's license number in the data field that requests the user's driver's license number. In this way, not only does the user not have to retrieve or recall the driver's license number, but the analytics module 115 also generates or supplements the field data 125 indicating that the particular data field requests the user's driver's license number. As the user matches more data fields to various icons, the analytics module 115 continues to generate augmented image data 127 and catalogs what type of information is requested in each data field of the image data 117. The user can then look at the augmented image data 127 and copy by hand the user attribute data entries in each of the data fields into the fields of the paper form. Furthermore, in this way the analytics module 115 catalogs the paper form as a known paper form and stores data related to the paper form in the known form data 126. In the future, if the same user or any other user of the form-fill assistance system 111 captures an image of this paper form, the form-fill assistance system 111 can match that image to the paper form in the known form data 121.

In one embodiment, when the user interface module 112 presents icons 123 to the user, the user interface module 112 does not present every available icon 123. Instead, the user interface module 112 presents an icon or symbol which, if selected by the user, provides additional icons 123. The content pool 113 may include hundreds of icons 123, but may initially present only the most commonly used icons 123 to the user. The user can then request the user interface module 112 to display additional icons 123 if an icon related to a data type requested in one of the data fields is not initially presented.

In one embodiment, the user can match the data fields to respective icons by dragging and dropping selected icons 123 into appropriate data fields. For example, if the user computing environment 130 includes a touch screen on which the image data 117 and the icons 123 are presented, then the user can touch an icon and drag it to the appropriate data field, at which point the analytics module 115 generates augmented image data 127 by immediately populating that data field with the appropriate user attribute data entry are presented by the selected icon. In this case the user will see that the data field is suddenly populated with the appropriate user attribute data entry. Alternatively, the user can use a mouse, a stylus, a light pen, eye tracker, or any other tool or method to match the data fields of the image data 117 to the appropriate icons 123.

In one embodiment, as the user matches data fields of the image data 117 to respective icons 123, the analytics module 115 continuously updates the field data 125 and compares the updated field data 125 to the known form data in order to match the image data 117 to a known form as are presented in the known form data 126. For example, after the analytics module 115 learns the type of data requested in one or more data fields of the image data 117, the analytics module 115 may then be able to match the image data 117 to a known form even though the analytics module 115 was initially unable to match the image data 117 to a known form. If the analytics module 115 subsequently matches the image data 117 to a known form, the analytics module 115 can generate augmented image data 127 that populates some or all of the remaining data fields with appropriate user attribute data entries retrieved from the user attribute data 121. The analytics module 115 can present augmented image data including the newly populated data fields of the image data 117 to the user. The analytics module 115 can request that the user verify that the data fields of the image data 117 have been correctly populated and/or identified. The user can then proceed to fill in the paper form.

If the image data 117 was matched to a known form type the new image of the known form type will be added to the database of the known forms and can be used to improve the matching capability of the analytics module 115 for the forms of the same type.

If the image data 117 was not matched to a known form a new form type will be created in the database of the known forms along with the image data 117, as well as the information about the position and types of data attributes required by this form type.

While FIG. 1 discloses that the various modules of the form-fill assistance system are associated with a service provider computing environment 110 that is separate from the user computing environment 130, in practice, the service provider computing environment 110 can overlap with the user computing environment 130. Some or all of the components of the form-fill assistance system 111 can be included in a software application stored or implemented in the user computing environment 130. For example, the user computing environment 130 may include a smart phone or a tablet computer, or a head wearable AR eye glass device (Google Glass, etc.) on which is stored a software application corresponding to the form-fill assistance system 111. In order to utilize the form-fill assistance system 111, the user can activate the software application corresponding to the form-fill assistance system 111 on the mobile device or tablet. Some or all of the operations performed by the form-fill assistance system 111 in providing augmented reality form-fill assistance to the user can be performed by computing systems associated with the smart phone or tablet. In one embodiment, some operations associated with the various modules of the form-fill assistance system 111 can be executed in the user computing environment 130, while other operations of the same modules can be executed in the computing environments remote from the user computing environment 130.

In one exemplary implementation of the form-fill assistance system 111, a user enters an urgent care medical facility to be treated for an illness. The staff at the urgent care medical facility hands to the user two forms for the user to fill out prior to receiving medical care. The user takes out a tablet computing device that includes a camera in the software application related to the form-fill assistance system 111. The user takes a picture of the first form with the tablet and activates the software application corresponding to the form-fill assistance system 111. The form-fill assistance system 111 receives image data 117 corresponding to the picture of the first paper form, analyzes the image data 117 and generates field data 125 that identifies relative positions and sizes of data fields in the image data 117 corresponding to fields of the first paper form. The analytics module 115 compares the image data 117, including the field data 125, to the known form data 126 in the form database 128. The analytics module 115 matches the image data 117 to a known paper form represented by the known form data 126. The analytics module 115 ascertains the type of data requested in each data field of the image data 117 based on the matched known form. The analytics module 115 retrieves user attribute data 121 from the data acquisition module 114 and generates augmented image data 127 by populating each data field of the image data 117 with an appropriate user data attribute entry. The data fields may request a name, an address, a name of employer, a Social Security number, an insurance carrier, etc. The analytics module 115 enters into the requested user attribute data entries corresponding to these types of data. The user interface module 112 then provides the augmented image data 127 for viewing by the user. The user can then verify that the form has been correctly identified and filled out. At this point, the user can elect to fill out by hand the first paper form while referencing the augmented image data 127. Alternatively, the user may request to print the augmented image data on a printer located at the urgent care medical facility or electronically submit the augmented image data 127 to the urgent care medical facility.

In one example, the user then proceeds to acquire form-fill assistance for filling out the second form in the urgent care medical center. Accordingly, the user positions the camera of the mobile phone or tablet to acquire an image of the second form. In this case, the analytics module 115 is not able to match the image data 117 related to the second form to any known form is represented by the known form data 126. The form-fill assistance system 111 then displays for the user a plurality of icons 123 alongside the image data 117. The user then matches each data field of the image data 117 to a respective icon 123. Each icon represents a type of data that may be requested in the fields of the paper form. As the user matches the data fields to respective icons, the form-fill assistance system 111 populates the data fields with the corresponding user attribute data entries. The form-fill assistance system 111 catalogs the type of data requested in each of the data fields in the known form data 126 so that the second form can be recognized by subsequent users of the form-fill assistance system 111. In this way, the form-fill assistance system 111 both enrolls and catalogs new forms and provides augmented reality form-fill assistance to the user.

In one embodiment, the form-fill assistance system 111 augmented image data 127 related only to that portion of the paper form that is currently in a viewfinder of the user's computing device. For example, when the user activates the form-fill assistance system 111 and holds the user computing device, which includes a camera, in a position to view at least a portion of the paper form, form-fill assistance system 111 provides augmented image data 127 only for that portion of the paper form that is currently in the viewfinder. Thus, as the user moves the computing device to include various portions of the paper form, the form-fill assistance system 111 provides populates those data fields that are currently displayed in the viewfinder. The user can position the user computing device to view whichever portion of the paper form that the user would like assistance in filling in this way the disclosed augmented reality form fill assistance system allows users to use the paper form (which may have multiple pages) to overcome the challenges of cumbersome navigation of multi-page documents on mobile devices with limited input methods and small display screens that can show only a small portion of any single paper page at any one time.

Embodiments of the present disclosure address some of the shortcomings associated with traditional form-fill assistance systems that do not adequately provide assistance in filling paper forms. A form-fill assistance system in accordance with one or more embodiments provides augmented reality form-fill assistance to a user based on analysis of image data related to a paper form and matching the image data with a known paper form is represented by known form data. The various embodiments of the disclosure can be implemented to improve the technical fields of user experience, services marketing, data collection, and data processing. Therefore, the various described embodiments of the disclosure and their associated benefits amount to significantly more than an abstract idea. In particular, by providing augmented reality form-fill assistance to users, users save both time and money.

Process

Figure 2:
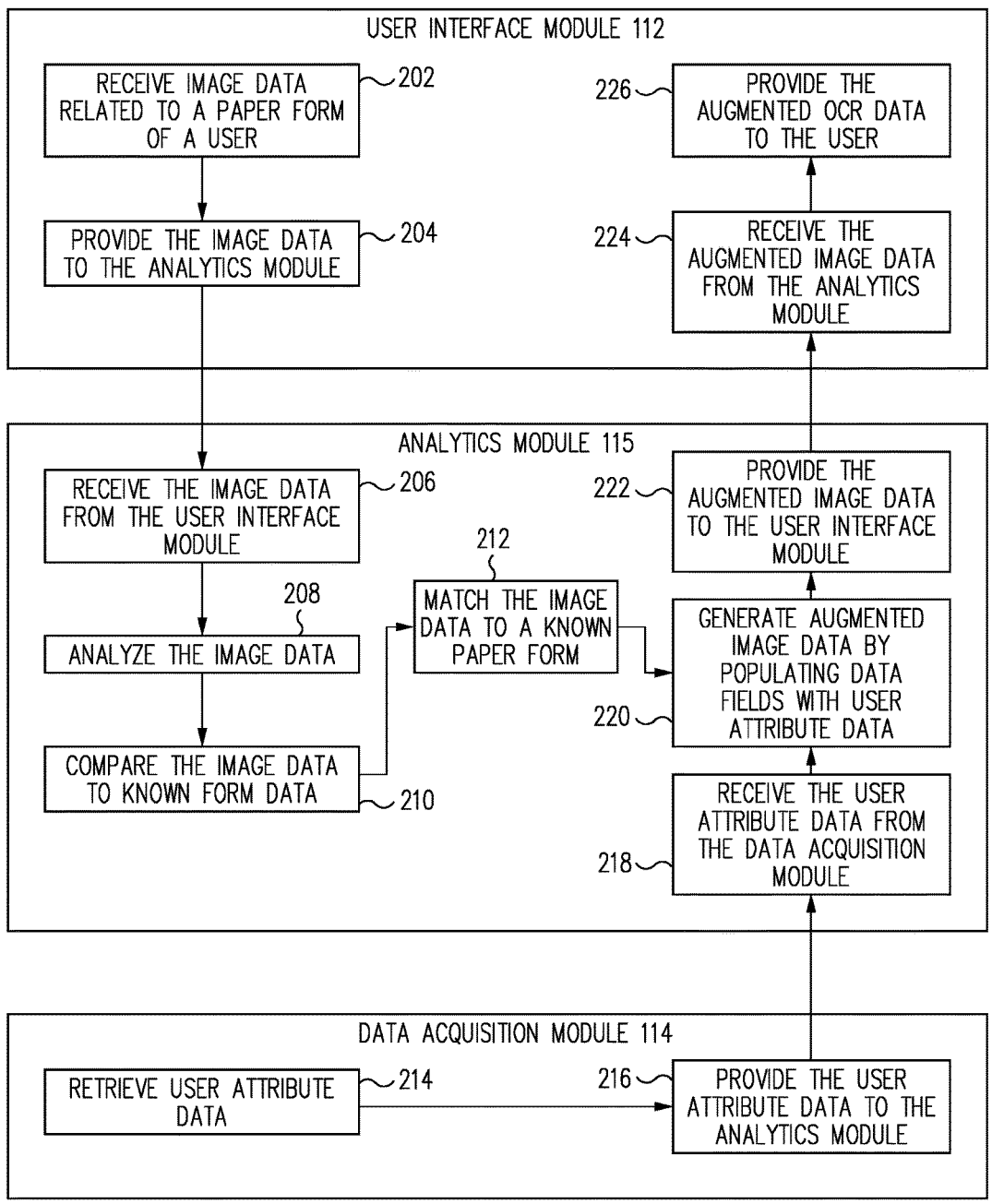
FIG. 2 is a block diagram of a process for providing augmented reality form-fill assistance, in accordance with one embodiment.

FIG. 2 illustrates a functional flow diagram of a process 200 for providing augmented reality form-fill assistance to a user, in accordance with one embodiment.

At block 202, the user interface module 112 receives image data related to a paper form of a user, according to one embodiment. From block 202 the process proceeds to block 204.

At block 204, the user interface module 112 provides the image data to the analytics module 115, according to one embodiment. From block 204, the process proceeds to block 206.

At block 206, the analytics module 115 receives the image data from the user interface module 112, according to one embodiment. From block 206, the process proceeds to block 208.

At block 208, the analytics module 115 analyzes the image data, according to one embodiment. From block 208, the process proceeds to block 210

At block 210, the analytics module 115 compares the image data to known form data, according to one embodiment. From block 210, the process proceeds to block 212.

At block 212, the analytics module 115 matches the image data to a known paper form as represented by the known form data, according to one embodiment.

At block 214, the data acquisition module 114 retrieves user attribute data, according to one embodiment. From block 214, the process proceeds to block 216.

At block 216, the data acquisition module 114 provides the user attribute data to the analytics module 115, according to one embodiment. From block 216, the process proceeds to block 218.

At block 218, the analytics module 115 receives the user attribute data from the data acquisition module 114, according to one embodiment. From block 218, the process proceeds to block 220.

At block 220, the analytics module 115 generates augmented image data by populating the data fields with user attribute data, according to one embodiment. From block 220, the process proceeds to block 222.

At block 222, the analytics module 115 provides the augmented image data to the user interface module 112, according to one embodiment. From block 222, the process proceeds to block 224.

At block 224, the user interface module 112 receives the augmented image data from the analytics module 115, according to one embodiment. From block 224, the process proceeds to block 226.

At block 226, the user interface module 112 provides the augmented image data to the user, according to one embodiment.

Although a particular sequence is described herein for the execution of the process 200, other sequences can also be implemented.

Figure 3:
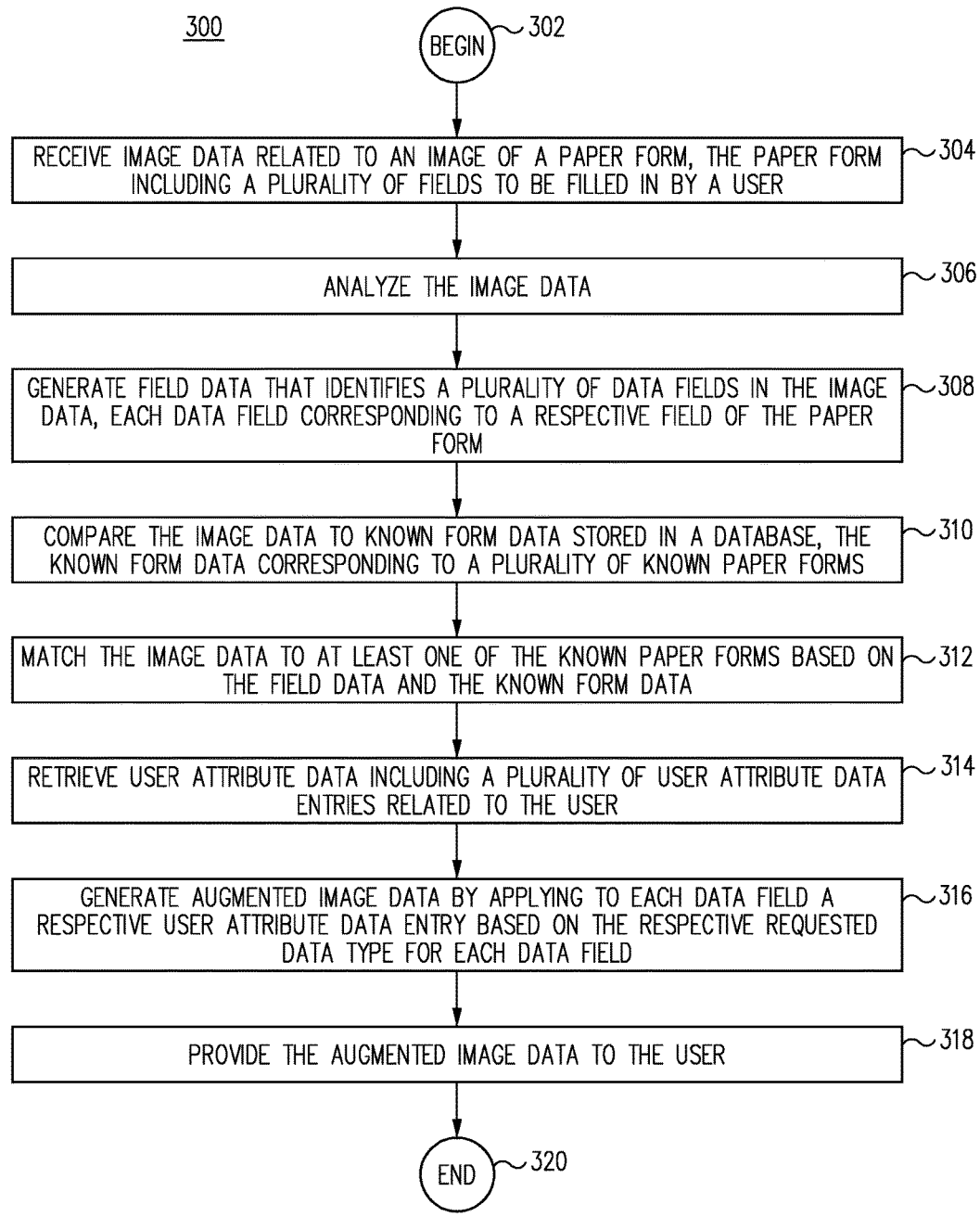
FIG. 3 is a flow diagram of a process for providing augmented reality form-fill assistance, in accordance with one embodiment.

FIG. 3 illustrates a flow diagram of a process 300 for providing augmented form-fill assistance to a user, according to various embodiments.

In one embodiment, process 300 for providing augmented reality form-fill assistance to a user begins at BEGIN 302 and process flow proceeds to RECEIVE IMAGE DATA RELATED TO AN IMAGE OF A PAPER FORM, THE PAPER FORM INCLUDING A PLURALITY OF FIELDS TO BE FILLED IN BY A USER 304.

In one embodiment, at RECEIVE IMAGE DATA RELATED TO AN IMAGE OF A PAPER FORM, THE PAPER FORM INCLUDING A PLURALITY OF FIELDS TO BE FILLED IN BY A USER 304 process 300 for providing augmented reality form-fill assistance to a user receives image data related to an image of a paper form, the paper form including a plurality of fields to be filled in by a user.

In one embodiment, once process 300 for providing augmented reality form-fill assistance to a user receives image data related to an image of a paper form, the paper form including a plurality of fields to be filled in by a user at RECEIVE IMAGE DATA RELATED TO AN IMAGE OF A PAPER FORM OF A USER OF A FINANCIAL SYSTEM 304 process flow proceeds to ANALYZE THE IMAGE DATA 306.

In one embodiment, at ANALYZE THE IMAGE DATA 306, process 300 for providing augmented reality form-fill assistance to a user analyzes the image data.

In one embodiment, once process 300 for providing augmented reality form-fill assistance to a user analyzes the image data at ANALYZE THE IMAGE DATA 306, process flow proceeds to GENERATE FIELD DATA THAT IDENTIFIES A PLURALITY OF DATA FIELDS IN THE IMAGE DATA, EACH DATA FIELD CORRESPONDING TO A RESPECTIVE FIELD OF THE PAPER FORM 308.

In one embodiment, at GENERATE FIELD DATA THAT IDENTIFIES A PLURALITY OF DATA FIELDS IN THE IMAGE DATA, EACH DATA FIELD CORRESPONDING TO A RESPECTIVE FIELD OF THE PAPER FORM 308, process 300 for providing augmented reality form-fill assistance to a user generates field data that identifies a plurality of data fields in the image data, each data field corresponding to a respective field of the paper form, according to one embodiment.

In one embodiment, once process 300 for providing augmented reality form-fill assistance to a user generates field data that identifies a plurality of data fields in the image data, each data field corresponding to a respective field of the paper form at GENERATE FIELD DATA THAT IDENTIFIES A PLURALITY OF DATA FIELDS IN THE IMAGE DATA, EACH DATA FIELD CORRESPONDING TO A RESPECTIVE FIELD OF THE PAPER FORM 308, process flow proceeds to COMPARE THE IMAGE DATA TO KNOWN FORM DATA STORED IN A DATABASE, THE KNOWN FORM DATA CORRESPONDING TO A PLURALITY OF KNOWN PAPER FORMS 310.

In one embodiment, at COMPARE THE IMAGE DATA TO KNOWN FORM DATA STORED IN A DATABASE, THE KNOWN FORM DATA CORRESPONDING TO A PLURALITY OF KNOWN PAPER FORMS 310 the process 300 compares the image data to known form data stored in a database, the known form data corresponding to a plurality of known paper forms.

In one embodiment, once process 300 compares the image data to known form data stored in a database, the known form data corresponding to a plurality of known paper forms at COMPARE THE IMAGE DATA TO KNOWN FORM DATA STORED IN A DATABASE, THE KNOWN FORM DATA CORRESPONDING TO A PLURALITY OF KNOWN PAPER FORMS 310, process flow proceeds to MATCH THE IMAGE DATA TO AT LEAST ONE OF THE KNOWN PAPER FORMS BASED ON THE FIELD DATA AND THE KNOWN FORM DATA 312.

In one embodiment, at MATCH THE IMAGE DATA TO AT LEAST ONE OF THE KNOWN PAPER FORMS BASED ON THE FIELD DATA AND THE KNOWN FORM DATA 312 the process 300 for providing augmented reality form-fill assistance to a user matches the image data to at least one of the known paper forms based on the field data and the known form data.

In one embodiment, once the process 300 for providing augmented reality form-fill assistance to a user matches the image data to at least one of the known paper forms based on the field data and the known form data at MATCH THE IMAGE DATA TO AT LEAST ONE OF THE KNOWN PAPER FORMS BASED ON THE FIELD DATA AND THE KNOWN FORM DATA 312, process flow proceeds to RETRIEVE USER ATTRIBUTE DATA INCLUDING A PLURALITY OF USER ATTRIBUTE DATA ENTRIES RELATED TO THE USER 314.

In one embodiment, at RETRIEVE USER ATTRIBUTE DATA INCLUDING A PLURALITY OF USER ATTRI- BUTE DATA ENTRIES RELATED TO THE USER 314 the process 300 for providing augmented reality form-fill assistance to a user retrieves user attribute data including a plurality of user attribute data entries related to the user.

In one embodiment, once the process 300 for providing augmented reality form-fill assistance to a user retrieves user attribute data including a plurality of user attribute data entries related to the user at RETRIEVE USER ATTRIBUTE DATA INCLUDING A PLURALITY OF USER ATTRIBUTE DATA ENTRIES RELATED TO THE USER 314, process flow proceeds to GENERATE AUGMENTED IMAGE DATA BY APPLYING TO EACH DATA FIELD A RESPECTIVE USER ATTRIBUTE DATA ENTRY BASED ON THE RESPECTIVE REQUESTED DATA TYPE FOR EACH DATA FIELD 316.

In one embodiment, at GENERATE AUGMENTED IMAGE DATA BY APPLYING TO EACH DATA FIELD A RESPECTIVE USER ATTRIBUTE DATA ENTRY BASED ON THE RESPECTIVE REQUESTED DATA TYPE FOR EACH DATA FIELD 316 the process 300 for providing augmented reality form-fill assistance to a user generates augmented image data by applying to each data field a respective user attribute data entry based on the respective requested data type for each data field.

In one embodiment, once the process 300 for providing augmented reality form-fill assistance to a user generates augmented image data by applying to each data field a respective user attribute data entry based on the respective requested data type for each data field at GENERATE AUGMENTED IMAGE DATA BY APPLYING TO EACH DATA FIELD A RESPECTIVE USER ATTRIBUTE DATA ENTRY BASED ON THE RESPECTIVE REQUESTED DATA TYPE FOR EACH DATA FIELD 316, process flow proceeds to PROVIDE THE AUGMENTED IMAGE DATA TO THE USER 318.

In one embodiment, at PROVIDE THE AUGMENTED IMAGE DATA TO THE USER 318 the process 300 for providing augmented reality form-fill assistance to a user provides the augmented image data to the user.

In one embodiment, once the process 300 for providing augmented reality form-fill assistance to a user provides the augmented image data to the user at PROVIDE THE AUGMENTED IMAGE DATA TO THE USER 318, process flow proceeds to END 320.

In one embodiment, at END 320 the process for providing augmented reality form-fill assistance to a user is exited to await new data and/or instructions. As noted above, the specific illustrative examples discussed above are but illustrative examples of implementations of embodiments of the method or process for providing augmented reality form-fill assistance to a user. Those of skill in the art will readily recognize that other implementations and embodiments are possible. Therefore the discussion above should not be construed as a limitation on the claims provided below.

In one embodiment, a computing system implements method for providing augmented reality form-fill assistance. The method includes receiving image data related to an image of a paper form, the paper form including a plurality of fields to be filled in by a user, analyzing the image data, generating field data that identifies a plurality of data fields in the image data, each data field corresponding to a respective field of the paper form, and comparing the image data to known form data stored in a database, the known form data corresponding to a plurality of known paper forms. The method further includes matching the image data to at least one of the known paper forms based on the field data and the known form data, determining, for each data field, a respective requested data type based on the at least one matched paper form, and retrieving user attribute data including a plurality of user attribute data entries related to the user. The method also includes generating augmented image data by applying to each data field a respective user attribute data entry based on the respective requested data type for each data field and providing the augmented image data to the user.

In one embodiment, a computing system implements method for providing augmented reality form-fill assistance. The method includes receiving image data related to an image of a paper form, the paper form including a plurality of fields to be filled in by a user, analyzing the image data, generating field data that identifies a plurality of data fields in the image data, each data field corresponding to a respective field of the paper form, and retrieving user attribute data including a plurality of user attribute data entries related to the user. The method further includes presenting a plurality of icons each related to a respective user attribute data entry, prompting the user to match each data field of the image data to a respective icon, receiving user selection data matching each data field to a respective icon. The method also includes generating augmented image data by populating each data field based on the user selection data and providing the augmented image data to the user.

In one embodiment, a system for providing augmented reality form-fill assistance to a user includes at least one processor and at least one memory coupled to the at least one processor. The at least one memory has stored therein instructions which, when executed by any set of the one or more processors, perform a process. The process includes receiving, with a user interface module of a computing system, image data related to an image of a paper form, the paper form including a plurality of fields to be filled in by a user, analyzing, with a user interface module of a computing system, the image data, and generating, with a user interface module of a computing system, field data that identifies a plurality of data fields in the image data, each data field corresponding to a respective field of the paper form. The process further includes comparing, with a user interface module of a computing system, the image data to known form data stored in a database, the known form data corresponding to a plurality of known paper forms, matching, with a user interface module of a computing system, the image data to at least one of the known paper forms based on the field data and the known form data, and determining, with a user interface module of a computing system, for each data field, a respective requested data type based on the at least one matched paper form. The process also includes retrieving, with a user interface module of a computing system, user attribute data including a plurality of user attribute data entries related to the user, generating, with a user interface module of a computing system, augmented image data by applying to each data field a respective user attribute data entry based on the respective requested data type for each data field, and providing, with a user interface module of a computing system, the augmented image data to the user.

In one embodiment, a system provides augmented reality form-fill assistance to a user. The system includes at least one processor and at least one memory coupled to the at least one processor, the at least one memory having stored therein instructions which, when executed by any set of the one or more processors, perform a process. The process includes receiving, with a user interface module of a computing system, image data related to an image of a paper form, the paper form including a plurality of fields to be filled in by a user, analyzing, with an analytics module of a computing system, the image data, and generating, with the analytics module, field data that identifies a plurality of data fields in the image data, each data field corresponding to a respective field of the paper form. The process further includes retrieving, with a data acquisition module of a computing system, user attribute data including a plurality of user attribute data entries related to the user, presenting, with the user interface module, a plurality of icons each related to a respective user attribute data entry, and prompting, with the user interface module, the user to match each data field of the image data to a respective icon. The process also includes receiving, with the user interface module, user selection data matching each data field to a respective icon, generating, with the analytics module, augmented image data by populating each data field based on the user selection data, and providing, with the user interface module, the augmented image data to the user.

In one embodiment, a non-transitory computer-readable medium has a plurality of computer-executable instructions which, when executed by a processor, perform a method for providing augmented form-fill assistance to a user. The instructions include a user interface module configured to receive image data related to an image of a paper form to be filled out by a user and a data acquisition module configured to gather user attribute data including a plurality of user attribute data entries related to the user. The instructions further include an analytics module configured to analyze the image data, to compare the image data to known form data, to match the image data to a known paper form based on the known form data, and to generate augmented reality image data by populating each data field with a respective user attribute data entry based on the known form data, the user interface module being configured to provide the augmented image data to the user.

As discussed in more detail above, using the above embodiments, with little or no modification and/or input, there is considerable flexibility, adaptability, and opportunity for customization to meet the specific needs of various parties under numerous circumstances.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "adding", "aggregating", "alerting", "applying", "analyzing", "associating", "calculating", "capturing", "categorizing", "classifying", "comparing", "creating", "defining", "detecting", "determining", "distributing", "eliminating", "encrypting", "extracting", "filtering", "forwarding", "generating", "identifying", "implementing", "informing", "monitoring", "obtaining", "posting", "processing", "providing", "receiving", "requesting", "saving", "sending", "storing", "substituting", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented method for providing augmented reality form-fill assistance, the method comprising:
   receiving image data representing an image of a blank paper form which has not yet been filled in, the paper form including a plurality of fields to be filled in by a user;
   analyzing the image data by comparing the image data to known form data, the compared data including relative positions and sizes of data fields of the image data and the known form data and matching the image data to a known paper form based on the known form data;
   generating field data that identifies a plurality of data fields in the image data, each data field corresponding to a respective field of the paper form;
   retrieving user attribute data including a plurality of user attribute data entries of the user;
   presenting a plurality of icons each related to a respective user attribute data entry;
   prompting the user to match each data field of the image data to a respective icon;
   receiving user selection data matching each data field to a respective icon;
   generating augmented image data by populating each data field of the image data based on the user selection data, the generated augmented image data including the originally received image data having one or more of the data fields of the original image populated with user data of the user; and
   providing the augmented image data to the user.

2. The method of claim 1, wherein one or more of the icons include a portion of a user attribute data entry.

3. The method of claim 1 wherein one or more of the icons includes a graphic indicative of a type of the related data attribute entry.

4. The method of claim 1, further comprising generating new known form data by determining, for each data field, a respective requested data type based on the user selection data.

5. The method of claim 4, further comprising adding the new known form data to a database including known form data related to a plurality of known paper forms.

6. The method of claim 5, further comprising:
   receiving, from a second user, second image data related to a second image of a copy of the paper form;
   analyzing the second image data;
   matching the image data to the new known form data;
   retrieving second user attribute data including second user attribute entries related to the second user;
   generating second augmented image data by applying a respective second user attribute entry to each data field of the second image based on the attribute type data; and
   providing the second augmented image data to the second user.

7. The method of claim 4 wherein the requested data types include one or more of:
   a first name;
   a last name;
   an address;
   a credit card number;
   a social security number;
   an identification number;
   a birthdate;
   a license plate number;
   medical data;
   data related to a spouse;
   data related to a child;
   a driver's license number;
   a name of an employer;
   tax data;
   financial data;
   a business address;
   a phone number;
   an email address;
   an emergency contact;
   a name of a parent; and
   an occupation.

8. The method of claim 1, further comprising retrieving the user attribute data from a third party database.

9. The method of claim 1, further comprising retrieving the user attribute data from a social media application.

10. The method of claim 1, further comprising retrieving the user attribute data from a database stored on a computing device of the user.

11. The method of claim 1, further comprising retrieving the user attribute data from a public database.

12. The method of claim 1, further comprising collecting the user attribute data by receiving the user attribute data from the user.

13. The method of claim 1, further comprising transmitting the augmented image data to an organization associated with the form.

14. The method of claim 13 wherein transmitting the augmented image data includes one or both of faxing the augmented image data to the organization or emailing the augmented image data to the organization.

15. The method of claim 1, further comprising transmitting the augmented image data to a printing device configured to print the adjusted second image data.

16. The method of claim 1, wherein analyzing the image data includes performing OCR analysis.

17. The method of claim 16 wherein analyzing the image data includes performing image feature extraction.

* * * * *